GETTER DEVICES

Filed April 28, 1967 5 Sheets-Sheet 1

INVENTOR.
PAOLO DELLAPORTA
BY
Plumley, Tyner & Sandt
ATTORNEYS

*INVENTOR.*
PAOLO DELLAPORTA

*BY*
Plumley, Tyner & Sandt
ATTORNEYS

INVENTOR.
PAOLO DELLAPORTA

BY

Plumley, Tyner & Sandt

ATTORNEYS

INVENTOR.
PAOLO DELLAPORTA
BY
Plumley, Tyner & Sandt
ATTORNEYS

INVENTOR.
PAOLO DELLAPORTA

BY

Plumley, Tyner & Sandt
ATTORNEYS

United States Patent Office 3,385,420
Patented May 28, 1968

3,385,420
GETTER DEVICES
Paolo Della Porta, Milan, Italy, assignor to S.A.E.S. Getters S.p.A., Milan, Italy, a company of Italy
Filed Apr. 28, 1967, Ser. No. 634,590
Claims priority, application Italy, Apr. 28, 1966, 17,225/66
10 Claims. (Cl. 206—.4)

ABSTRACT OF THE DISCLOSURE

A getter device capable of evaporating over 80 weight percent of its getter metal when subjected to an alternating inductive field comprising: a retainer and a mass of compressed powder in contact with the retainer. The mass of compressed powder comprises a getter metal such as barium and an exothermic material such as a mixture of aluminum and nickel. The getter devices of the present invention are useful for maintaining high vacuum in closed vessels.

DISCLOSURE

This invention relates to getter devices and in particular to getter devices of the exothermic type which are especially useful for maintaining high vacuum in closed vessels such as television picture tubes.

The most widely used types of getter devices consist of annular containers having a channel shaped cross section, wherein a compressed mass of powder is arranged. The powder contains a getter metal such as barium which is vaporizable at sub-atmospheric pressures under the influence of heat which is generally supplied by an alternating inductive field. There are three fundamental types of such getter devices. (1) Endothermic getter devices which, by means of heating under vacuum at temperatures of about 1000° C. and higher, slowly emit the vapors of the getter metal. These vapors condense in form of a getter metal film on the internal surfaces of the vessel. This getter metal film then sorbs residual gasses in the vessel. (2) Exothermic getters, in which the compress mass of powder contains in addition to the getter metal an exothermic material such as a mixture of aluminum and nickel which is capable of reaction with the consequent production of exothermic heat when heated to a temperature of about 700° C. to 1000° C. These getters emit about 40% of the gas adsorbing material as vapors within a very short time and the emission continues by continuing the heating for 10–20 seconds. (3) Exothermic getters with gas doping, which differ from the above described simple exothermic gétters in that they contain materials which upon heating, before or during the emission of the getter metal vapors, emit a gas which causes the condensation of said vapors in the form of submicroscopic drops having great surfaces exposed to the gas to be adsorbed and having therefore exceptional gas adsorbing properties.

While the above described and other prior art getter devices are widely used to deposit gas sorbtive getter metal films on the internal surfaces of evacuated vessels, these devices suffer from a number of disadvantages which limits their use. For instance in the prior art exothermic getters the exothermic heat produced generally vaporizes only about 40 weight percent of the getter metal present in the compressed mass of powder. Continued heating for relatively long periods of up to 30 seconds is necessary in order to vaporize additional getter metal. Even with continued heating these prior art getter devices rarely if ever yield 80 weight percent of their getter metal content.

Another disadvantage of these prior art getter devices is the lack of reproducibility of the yield, thus the amount of getter metal vaporized varies widely even when identical devices are heated under identical conditions. Continued heating in an attempt to increase the yield of vaporized getter metal is undesirable because of the danger of melting the annular container. Melting of the container is undesirable for many reasons and particularly because it is apt to release particles of the compressed mass of powder. These particles are generally electrically conductive and cause short circuits between other electrical components present in the vessel.

Yet another disadvantage of these prior art getter devices is their propensity to cause breakage when their getter metal is vaporized close to or resting on the wall of a cathode ray tube. These cathode ray tubes such as television picture tubes generally comprise a rather narrow cylindrical neck attached to a conical section which terminates in the viewing screen. For a variety of reasons it has become advantageous in recent years to vaporize the getter metal from getter devices while the devices rest on the conical section of the picture tube. These tubes are generally made of glass which is sensitive to localized temperature gradients. If one portion of the tube is raised to temperatures greatly different from surrounding portions of the tube the thermal stresses created may cause cracking of the tube. For this reason extended heating of the getter devices must be avoided.

It is therefore an object of the present invention to provide novel getter devices free of the disadvantages of prior art getter devices.

Another object of the present invention is to provide novel getter devices which evaporate over 80 weight percent of its getter metal when heated.

A further object of the present invention is to provide novel getter devices which release the major portion of their getter metal within a few seconds.

A still further object of the present invention is to provide novel exothermic getter devices which require little or no continued heating after onset of the exothermic reaction.

Yet another object of the present invention is to provide novel getter devices having a high degree of reproducibility of the yield.

Yet another object of the present invention is to provide novel getter devices from which a high percentage of their getter metal content can be vaporized while the getter devices are close to or resting on the glass walls of a picture tube without cracking the tube.

The foregoing and other objects are accomplished according to the present invention by providing a getter device comprising: a retainer and, a mass of compressed powder in contact with the retainer, wherein the mass of compressed powder comprises a getter metal and an exothermic material and wherein the mass has a ratio of exposed surface area to weight of at least 0.45 $mm.^2$/mg. These getter devices have at least 47% of their surface area exposed.

The retainers useful in the present invention can be those of channel shaped cross sections of sufficient width to give the large exposed surface areas necessary in the present invention. The bottoms of these retainers can have a plurality of openings in order to increase the exposed surface area of the mass of compressed powder retained therein. The openings can have any convenient shape such as round, square, oval etc. These retainers are in contact with the mass of compressed powder and are preferably of inductively heatable material such as iron or any of the well-known ferrous alloys. When subjected to an alternating inductive field these retainers heat up and transfer their heat to the mass of powdered material.

The mass of compressed powder comprises a getter metal and an exothermic material. The getter metals useful in the getter devices of the present invention are well-known in the art and in general consist of any metal which is vaporizable under the influence of heat at sub-atmospheric pressures and preferably those below one mm. Hg. Although any suitable getter metal can be employed in the present invention, the preferred getter metal is barium. The exothermic materials can be any material that undergoes an exothermic reaction but is preferably aluminum and nickel. The preferred compressed powders useful in the getter devices of the present invention are granulated alloys of barium aluminum and nickel, a typical analysis of which is 28.5 weight percent barium, 28.5 weight percent aluminum, and 43 weight percent nickel.

It has been found, according to this invention, that the best ratio of the exposed surface to the mass of volume of compressed powder is at least 0.45 and preferably from 0.6 to 0.9 and most preferably about 0.7 $mm.^2/mg.$ (3 $mm.^2/mm.^3$). Traditional getters have the corresponding values of about 0.2–0.3 $mm.^2/mg.$ (0.9–1.3 $mm.^2/mm.^3$). It has been observed that a getter device having the preferred ratios emit a quantity of getter metal within a few seconds from the beginning of the exothermic reaction which reaches up to 90% of the total quantity of getter metal contained in the mass.

In a preferred embodiment of the present invention the mass of compressed powder is exposed on a plurality of surfaces. When this is the case it is desirable to also provide the getter devices of the present invention with guide means for directing the getter metal vapor in one direction. One form of guide means is an inductively heatable shield which will reevaporate any getter metal which becomes deposited thereon during the vaporization.

In order to more completely illustrate the objects and advantages of the present invention reference is now made to the drawings wherein.

FIGURES 3, 5, 7, 9, 11, 13, 15, 17, 19, 21, 23 and 25 are each plane views of the getter devices of the present invention and, FIGURES 4, 6, 8, 10, 12, 14, 16, 18, 20, 22, 24 and 26 are enlarged sectional views taken respectively along lines 4—4, 6—6, 8—8, 10—10, 12—12, 14—14, 16—16, 18—18, 20—20, 22—22, 24—24, and 26—26, of FIGURES 3, 5, 7, 9, 11, 13, 15, 17, 19, 21, 23, and 25.

Figure 2:
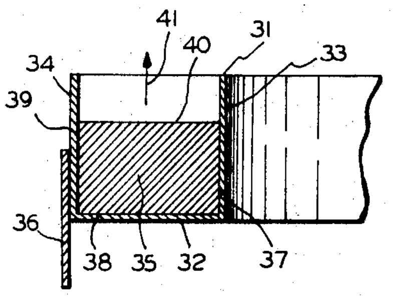
FIGURE 2 is an enlarged section taken along line 2—2 of FIGURE 1.
Figure 1:
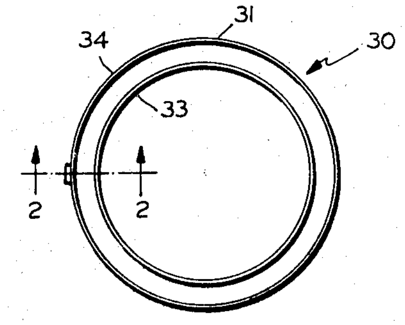
FIGURE 1 is a plane view of a known getter device.

Referring now to the drawings and in particular to FIGURES 1 and 2, there is shown a known getter device 30. The getter device 30 comprises a retainer 31 in the form of an annular ring. The retainer 31 has a bottom 32 to which are attached an inner vertical wall 33 and an outer vertical wall 34. Within the confines of the retainer 31 is a mass 35 of compressed powder. This powder has been compacted to make it self supporting. The powder 35 comprises a getter metal such as barium and an exothermic heat producing material such as a mixture of aluminum and nickel. The mass 35 has a plurality of surfaces, in this case four. The inside surface 37 is in contact with the wall 33; the lower surface 38 is in contact with the bottom 32 of the retainer 31; and the outer surface 39 is in contact with the outer wall 34. Only the surface 40 is exposed. Attached to the retainer 31 is a support 36 which can be used to position the getter device 30 within the confines of a vessel such as a cathode ray tube to be evacuated.

In operation the getter device 30 is placed in a vessel to be evacuated, the internal pressure is reduced by mechanical means and the getter device 30 is then subjected to an alternating inductive field as is well-known in the art. This alternating inductive field heats those parts of the getter device 30 such as the retainer 31 and the support 36 which are made of inductively heatable material such as iron. The powder 35 is also heated to a certain extent but generally to a lesser degree than the retainer 31. As the time of exposure to the inductive field increases the temperature of the powder increases to the point, usually between about 700° C. and 1000° C., where the exothermic reaction begins. This exothermic reaction releases a large amount of heat in a short time and provides the heat of vaporization of a portion of the getter metal. The getter metal escapes from the powder 35 in the direction of the arrow 41. However, in known devices such as getter devices 30 the portion of the getter metal vaporized is frequently quite low, being of the order of magnitude of 40 weight percent of the total weight of getter metal present in the powder 35. A part of that portion of the getter metal which is not vaporized by the heat of the exothermic reaction can be vaporized by continued exposure of the getter device 30 to the alternating inductive field. However, exposure is frequently necessary for extending periods of up to 30 seconds or more and even then the total portion of getter metal evaporated rarely if ever exceeds 80 weight percent of the total amount present in the powder 35. Furthermore when the getter device 30 is provided with three equally spaced supports 36 to permit the getter device 30 to be flashed, as vaporization of the getter metal is termed, while resting on the internal surface of the wall of a glass vessel, these extended periods of exposure to the inductive field cause heating of the glass wall by conduction from the inductively heatable supports 36 and radiation from the retainer 31. This heating causes localized thermal gradients in the glass wall which frequently results in breakage of the vessel. Additionally the percentage of getter metal evaporated is widely variable being perhaps 45 weight percent for one device and 55 weight percent for another device of identical structure and powder composition when both are flashed under identical conditions. It is evident from this figure, that the exposed surface of the mass allowing the emission of the getter metal vapors from the mass represents only about 20–30% of the total surface of said mass 35 of compressed powder and corresponding to about 0.2–0.3 $mm.^2/mg.$ (0.9–1.3 $mm.^2/mm.^3$). To obtain a reasonable output from this type of getter, it is usually necessary to continue its heating up to 30 seconds.

Figure 4:
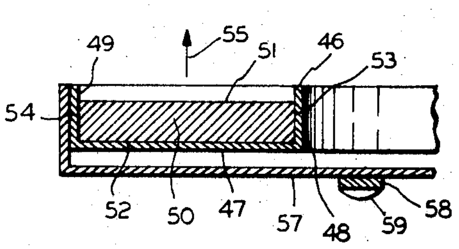
Figure 3:
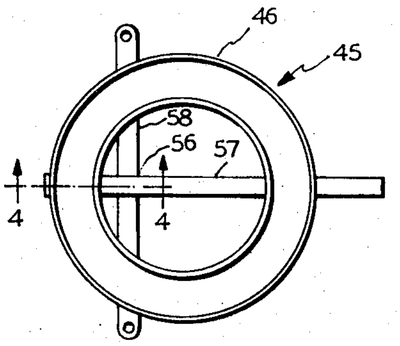

Referring now to FIGURES 3 and 4 there is shown a single embodiment of the novel getter devices of the present invention. The getter device 45 comprises a retainer 46 in the form of an annular ring. The retainer 46 has a bottom 47 to which are attached on inner vertical wall 38 and an outer vertical wall 49. Within the confines of the retainer 46 is a mass 50 of compressed powder of the same volume and density as the mass 35 of FIGURE 2. The mass 50 has an upper surface 51, a lower surface 52, an inner surface 53 and an outer surface 54. Only the upper surface 51 of the mass 50 is exposed, the other surfaces being in contact with the walls 48 and 49 and the bottom 47 of the retainer 46. As can be seen by reference to FIGURE 4 the thickness of the mass 50 i.e., the distance between surfaces 51 and 52, has been greatly reduced, with a corresponding increase in the width i.e., the distance between the surfaces 53 and 54. As shown in FIGURE 4, the thickness is a minimum compatible with the stability of the mass 50. By stability is meant the ability of the particles of compressed powder to retain sufficient cohesiveness such that the mass 50 does not crumble either in its unflashed state or after a portion of the getter metal has been evaporated. The exothermic heat which vaporizes the getter metal also tends to warp the mass 50. The area of the exposed surface 51 of the mass 50 constitutes about 47% of the total surface area and represents the minimum percentage of exposed surface area at which the advantages of the present invention are realized. Although some increase in yield over that of the prior art getter devices occurs at less than 47% the preferred devices of the present invention have an exposed surface area of at least 47%. This corresponds to a surface area to weight ratio of 0.45 $mm.^2/mg.$ and a surface area to volume ratio of 2 $mm.^2/mm.^3$. When flashed the getter metal vapor leaves the getter device 45 in the direction of the arrow 55. The getter device 45 is also provided with a support 56 comprising an elongated member 57 attached to the outer wall 49 of the retainer 46 and extending under the retainer bottom 47. Attached to the elongated member 57 is a transverse member 58 having on each extremity a semispherical foot 59. By means of this arrangement the getter device 45 can be flashed while the feet 59 are resting on the inside surface of a picture tube.

Figure 6:
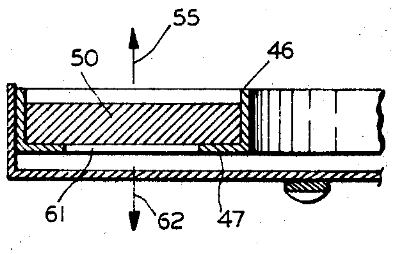
Figure 5:
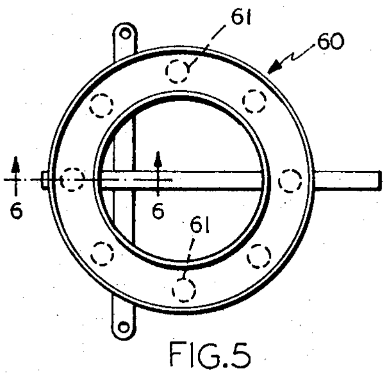
Figure 8:
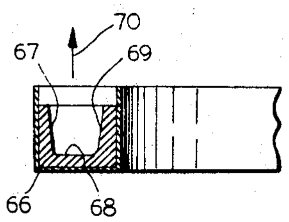
Figure 7:
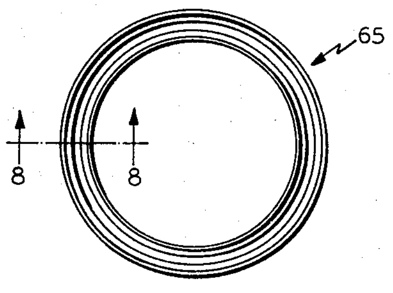

Referring now to FIGURES 5 and 6 there is shown another getter device 60 of the present invention identical in structure with the getter device 45 of FIGURES 3 and 4 with one exception, the retainer bottom 47 has a plurality of circular openings 61. These openings 61 permit the vaporized getter metal to leave the mass not only in the direction of the arrow 55 but also in the direction of the arrow 62. By means of the openings 61 the exposed surface area is increased to about 65% of the total surface corresponding to 0.7 $mm.^2/mg.$ (3 $mm.^2/mm.^3$).

Figure 10:
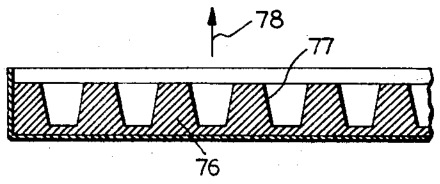
Figure 9:
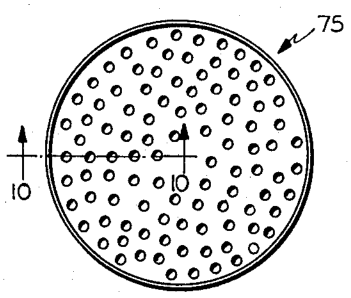
Figure 12:
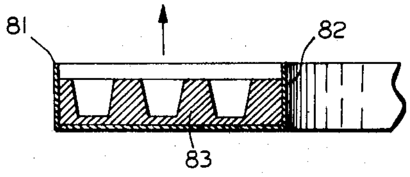
Figure 11:
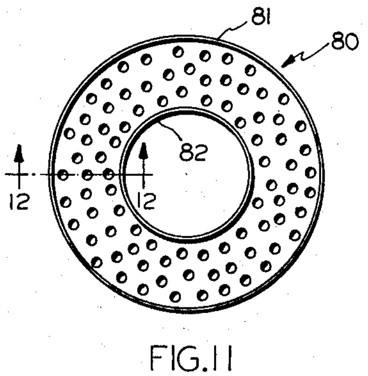

Referring now to FIGURES 7 through 12 there are shown getter devices of the present invention having increased exposed surface areas. These devices employ profiled masses and have the common advantage that the getter metal vapor leaves the mass in one direction. In these getter devices the containers are not weakened by openings. The getter device 65 of FIGURE 7 has a mass 66 of compressed powder having three internal juxtaposed surfaces 67, 68 and 69. The getter metal vaporizes in the direction of the arrow 70. In FIGURES 9 and 10 the getter device 75 has a mass 76 of powder which is provided with a plurality of surfaces 77 in the form of truncated cones. The getter metal vaporizes in the direction of the arrow 78. In FIGURES 11 and 12 there is shown a getter device 80 similar in all respects to the getter device 75 of FIGURE 9 except that the retainer 81 is provided with an inner wall 82 and the mass 83 of compressed powder is in the form of a washer.

Figure 14:
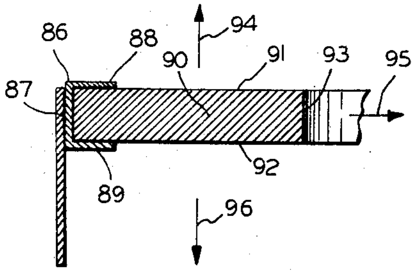
Figure 13:
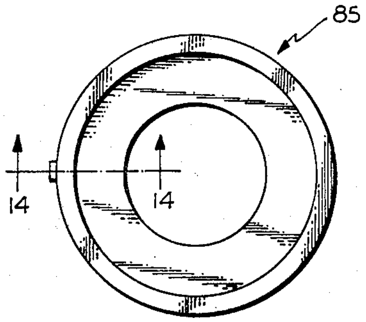

Referring now to FIGURES 13 and 14 there is shown an example of a preferred embodiment of the present invention wherein a plurality of surfaces are exposed. The getter device 85 comprises a retainer 86 having a vertical section 87 and attached thereto an upper horizontally extending section 88 and a lower horizontally extending section. Between the sections 88 and 89 is a mass 90 of compressed powder having an exposed upper surface 91, an exposed lower surface 92 and an exposed inner vertical surface 93. The getter metal vaporizes in three directions as shown by arrows 94, 95 and 96.

Figure 16:
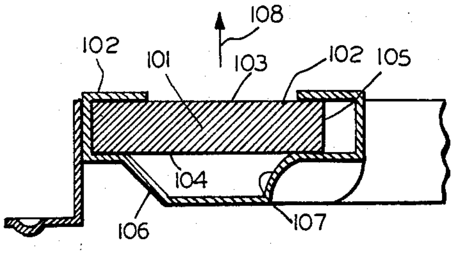
Figure 15:
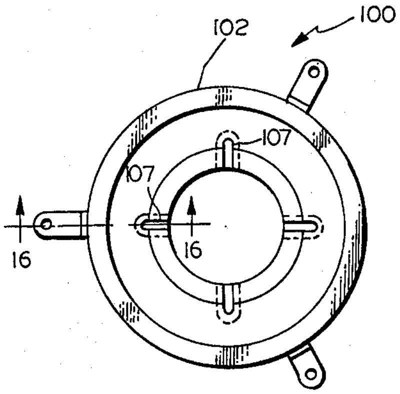

Referring now to FIGURES 15 and 16 there is shown a getter device 100 having a mass 101 of compressed powder enveloped by a thin sheet of aluminum 102, which serves to prevent the loss of particles of the compressed powder. The enveloped mass 101 is held only along its external circumference by a retainer 102 having a particular construction. The retainer 102, having the well-known annular shape, leaves the mass 101 exposed both with its upper surface 103 and with its lower surface 104 as well as with its internal vertical side 105. The retainer 102 embraces the external side of the mass of compressed powder and holds it firmly. The bottom 106 of the retainer 102 is so shaped to leave a free passage for the getter metal vapors and to act simultaneously as a screen and guide for the vapors. The retainer 102 has a plurality of embossed portions 107 along its internal circumference which act as running supports for the mass 101, allowing dilatations of said mass, due to the exothermic reactions for the evaporation of the getter metal vapors during the heating. The embossed portions 107 include metallic tongues acting as dilatation guides for the mass 101. The fundamental advantage of this embodiment lies in the fact that, without weakening the mass 101, as in FIGURES 7 through 12, or the retainer as in FIGURE 5 and 6, an improved getter is obtained with 3.5 $mm.^2$ exposed surface for 1 $mm.^3$ of compressed powder which is an almost ideal exposition of surface, and additionally one sole direction of emission of getter metal vapors is obtained as shown by the arrow 108.

FIGURES 17 through 26 show embodiments like that of FIGURES 15 and 16 insofar as the construction of the retainer is concerned, with screening and guide actions, so that the getter metal vapors are guided essentially in one sole main direction.

There are a number of advantages of this particular construction. First of all, the getter devices which are not mounted in the neck but are mounted on the wide surfaces of the cone of the picture tube, need wide and rigid supports so as to assure an exact position of the getter with respect of the glass of the tube. The screening container according to this invention can easily be provided with supporting feet so that mounting of special supports is avoided.

Figure 18:
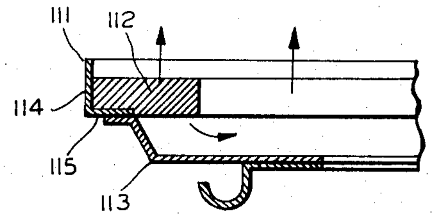
Figure 17:
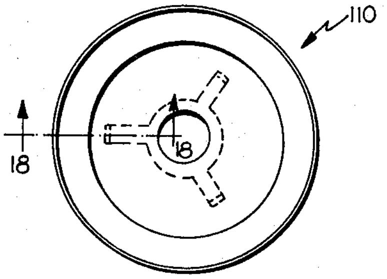

The glass of the cone of the picture tube is very sensitive to temperature gradients and therefore the deposition of getter metal vapors on the glass surface immediately beneath the getter must be avoided because in this case the barium film would adsorb too much heat and it would overheat the glass. The screening container serves to guide the barium vapors emitted by the underside of the compressed powder mass towards the opposed direction. In connection with the necessity of avoiding the overheating of the glass of the tube, another function of the screening container according to this invention has been discovered. If a screening container has an external diameter which is a little less than the diameter of the getter supported by said screening container, as shown in FIGURES 17 and 18, and if it is mounted as above said, on the internal side of the glass of the picture tube, the said screening container will be heated extremely slowly by a high frequency induction coil placed at the outside of the glass of the picture tube. This slow heating of the screening container is such that the getter is brought to red heat and is evaporated, while the screening container is heated to no more than 500–600° C. Thus the screening container acts actually not only as a guide screen for the direction of the getter metal vapors, but also as a heat screen against heat radiation between the hot mass and the glass, during the time, or during a good part of the time during which the getter is at high temperature and is emitting barium vapors. Another advantage of said screening container is the following: when a getter is mounted near the electron gun, that is to say internally of the cylindrical neck of the picture tube, the emitted getter metal vapors will be deposited in certain quantities around the getter device. Since the getter metal film thus formed on the glass adsorbs a certain part of the electric energy induced from the high frequency induction coil which is usually employed for heating the getter device said film, as soon as it is formed, will act as moderator of the heating of the getter and thus avoids overheating, localized melting and the like. When the getter device is mounted on the cone of the picture tube, as described above the barium film between the induction coil and the getter device must be avoided or at least limited to a minimum; furthermore the coil and the getter device are not placed on the same plane and the screening effect of an eventual barium film can be shown to be even more limited, and therefore an overheating of the getter device could take place. It has been found that the screening container according to this invention is an efficient thermic brake for the getter, which precludes overheaing and melting.

Referring now to FIGURES 17 and 18 there is shown a preferred getter device 110 comprising a retainer 111 a mass 112 and a shield 113. The retainer has a vertical wall 114 attached to a horizontal section 115 which is shorter than the width of the mass 112. The mass 112 is within the confines of the retainer 111, but has three of its surfaces exposed. Attached to the retainer 111 is a shield 113 which has a diameter slightly smaller than the outside diameter of the retainer 111 as explained above. The shield 113 is preferably constructed of an inductively heatable material and thus reevaporates any getter metal which is deposited thereon during the flashing operation.

Figure 20:
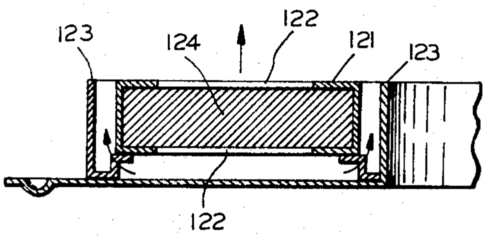
Figure 19:
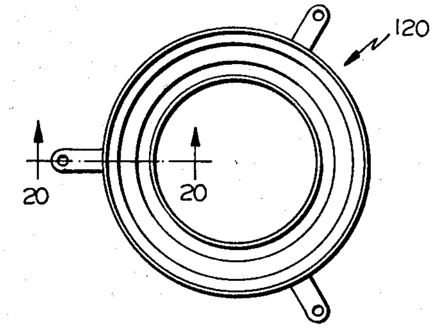

FIGURES 19 and 20 show a getter device 120 in which the retainer 121 has wide openings 122 both in the upper and in the underside, and in which the retainer 121 is contained in turn in a greater outer container 123, acting as screen and guide. The getter metal vapors which are emitted from the underside of the mass 124 are guided through an annular channel between the two containers 121 and 123 towards the upper side of the getter device 120.

Figure 22:
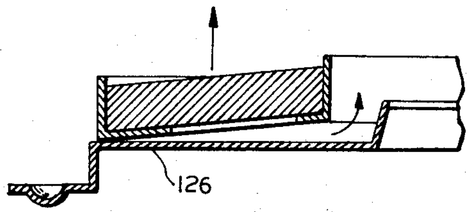
Figure 21:
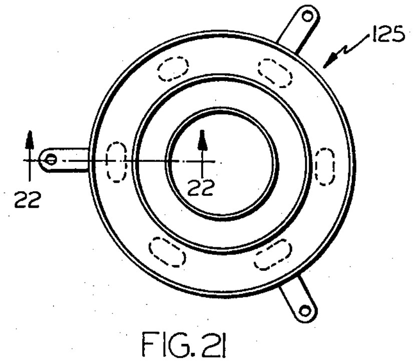

In the embodiment according to FIGURES 21 and 22, the getter device 125 has a shield 126 which is unilateral, instead of bilateral as in FIGURES 19 and 20. The getter device 125 has the advantage that its external circumference is free to adsorb the Foucault currents induced by the high frequency coil used for heating. By the arrangement of parts in the getter device 125 a problem of the getter device 120 is avoided wherein the first heating takes place on the screening container 123 and there is the danger of melting it before the evaporation of the getter metal begins.

Figure 24:
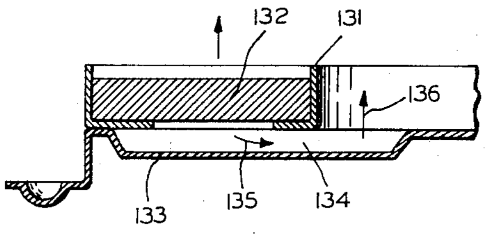
Figure 23:
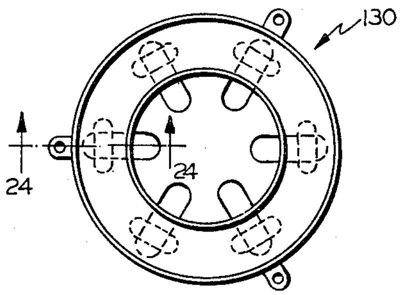

Referring now to FIGURES 23 and 24 there is shown a getter device 130 having a retainer 131, a mass 132 of powder within the retainer and a shield 133 attached to the retainer 131. The space between the bottom of the retainer 131 and the top of the shield 133 provides a passage 134 which is an effective means for directing the getter metal vapors in the direction of the arrows 135 and 136.

Figure 26:
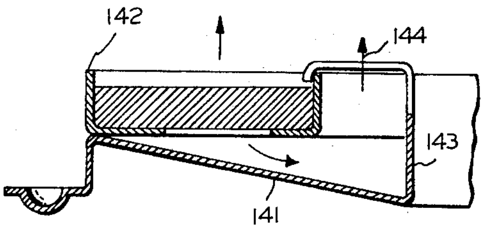
Figure 25:
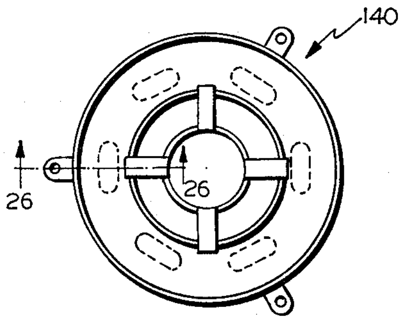

Referring now to FIGURES 25 and 26 there is shown a getter device 140 similar to the greater device 130 of FIGURE 23 except that the shield 141 is at an angle to the bottom of the retainer 142 and the inner extremity 143 of the shield 141 is vertical to more positively direct the getter metal vapors in the direction of the arrow 144. Although the invention has been described in considerable detail with reference to certain preferred embodiments thereof, it will be understood that variations and modifications can be effected within the spirit and scope of the invention as described above and as defined in the appended claims.

What is claimed is:

1. A getter device capable of evaporating a large percentage of its getter metal when subjected to an alternating inductive field, said getter device comprising: a retainer and, a mass of compressed powder in contact with said retainer, said mass of compressed powder comprising a getter metal and an exothermic material said mass having a ratio of exposed surface area to weight of at least 0.45 $mm.^2/mg.$

2. A getter device capable of evaporating a large percentage of its getter metal when subjected to an alternating inductive field said getter device comprising: a circular retainer and, a mass of compressed powder in contact with said retainer, said mass of compressed powder comprising a getter metal and an exothermic material said mass having a plurality of its surfaces exposed.

3. The getter device of claim 2 further comprising guide means for directing the getter metal vapor in one direction.

4. The getter device of claim 1 wherein the mass of compressed powder is supported by a containing support which is constructed so as to act as a screen and directional guide for the vapors which are emitted from the underside of said mass and which support has spacing feet formed thereon.

5. The getter device of claim 1 wherein the exposed surface area to mass ratio is between 0.6 and 0.8 $mm.^2/mg.$

6. A getter device capable of evaporating a large percentage of its getter metal when subjected to an alternating induction field comprising:

(A) a retainer having a vertical wall and a horizontal wall, and (B) a mass of compressed powder in contact with said retainer and extending radially inwardly beyond the limits of the retainer horizontal wall whereby the upper, inner, and a large portion of the lower surfaces of said mass are exposed, and (C) a shield attached to the retainer and extending downwardly and transversely from one side of the retainer to the other whereby vaporized getter metal emitted from the lower surface of the mass is reflected with the result that the vaporized getter metal leaves the getter device in predominantly one direction.

7. The getter device of claim 6, wherein the shield is constructed of an inductively heatable material whereby the shield reevaporates any getter metal deposited thereon while the getter device is in an inductive field.

8. Improved exothermic getter comprising a container or support for a mass of compressed powder said powder comprising an evaporable getter material, which is evaporable and capable of gas adsorbing when heated up to about 700–1000° C., wherein said mass of compressed powder is arranged in said container or support in such a way as to have a ratio of exposed surface area to weight of at least 0.45 $mm.^2/mg.$ whereby over 80% of the getter material is evaporated within the very short time of a few seconds.

9. A getter device comprising:

(A) a retainer having a substantially vertical wall and a substantially horizontal wall, and (B) a mass of compressed powder in contact with said retainer and extending radially inwardly beyond the limits of the retainer horizontal wall whereby the upper and inner surfaces of said mass are exposed.

10. A getter device of claim 8 comprising:

(A) a retainer having a substantially vertical wall and a substantially horizontal wall, and (B) a mass of compressed powder in contact with said retainer and extending radially inwardly beyond the limits of the retainer horizontal wall whereby the upper, inner, and a large portion of the lower surfaces of said mass are exposed.

References Cited

UNITED STATES PATENTS

| | | | |
|---|---|---|---|
| 2,344,931 | 3/1944 | Herzog et al. | |
| 3,195,716 | 7/1965 | Della Porta | 206—.4 |
| 3,207,294 | 9/1965 | Farrar et al. | 206—.4 |

FOREIGN PATENTS

| | | |
|---|---|---|
| 235,993 | 10/1961 | Australia. |

WILLIAM T. DIXSON, Jr., *Primary Examiner.*